A. ROEHR.
APPARATUS FOR GYMNASTIC PERFORMANCES.
APPLICATION FILED SEPT. 12, 1911.

1,111,970.

Patented Sept. 29, 1914.
5 SHEETS—SHEET 1.

WITNESSES:

INVENTOR
Arthur Roehr
BY
ATTORNEYS

A. ROEHR.
APPARATUS FOR GYMNASTIC PERFORMANCES.
APPLICATION FILED SEPT. 12, 1911.

1,111,970.

Patented Sept. 29, 1914.
5 SHEETS—SHEET 5.

WITNESSES:

INVENTOR
Arthur Roehr
BY
ATTORNEYS

UNITED STATES PATENT OFFICE.

ARTHUR ROEHR, OF NEW YORK, N. Y.

APPARATUS FOR GYMNASTIC PERFORMANCES.

1,111,970.  Specification of Letters Patent.  Patented Sept. 29, 1914.

Application filed September 12, 1911. Serial No. 648,835.

*To all whom it may concern:*

Be it known that I, ARTHUR ROEHR, (whose theatrical *nom de plume* is CHARLES ROHR,) a subject of the Emperor of Germany, residing in the city of New York, borough of Manhattan, county and State of New York, have invented a certain new and useful Apparatus for Gymnastic Performances, of which the following is a specification.

This invention is an apparatus for theatrical and exhibition purposes, the same being adapted, more particularly, for giving exhibitions of fancy bicycle riding, whereby entertainment and amusement is afforded an audience.

The apparatus when used in giving exhibitions of bicycle riding requires the service of skilled performers, for the reason that the bicycle or motorcycle employed is not attached to, or confined for movement in a predetermined path within, a cage, the position of which cage is intended to be changed during the performance, whereby training and skill on the part of the performer is required in order to balance himself and the vehicle within the cage, more particularly at the time of changing the position of the cage.

The bicycle is free to travel upon the inner surface of the cage, and in any desired path within the limits of said cage, the path being selected or determined by the rider for the purpose of keeping up the exhibition while the cage is being raised or lowered, or when the cage is turned from one position to another and back again to a normal position.

A salient feature of the apparatus is a cage, preferably open at the respective ends, and of slatted or open-work construction, so that the performer and the bicycle may be in the view of the audience.

A broadly new feature consists of means for bodily hoisting the cage, particularly during the performance.

Another broadly new feature consists of means for tilting or turning the cage on a horizontal axis and through an arc of 90°, more or less, whereby the performer is required to ride in circles within the cage, the axis of which may change from a horizontal to a vertical, and vice versa, and all the angles intermediate the horizontal and vertical.

Other features of the invention, and the advantages thereof, will appear from the following detailed description taken in connection with the drawings.

In the accompanying drawings, I have illustrated different practical embodiments of the invention, but the constructions shown therein are to be understood as illustrative, only, and not as defining the limits of the invention.

A designates a cage within which is adapted to travel a bicycle or motorcycle. Said bicycle or motorcycle is not attached to, or limited in any way to movement in a predetermined path within, the cage, but on the contrary, the bicycle or motorcycle is free to travel in any path selected or determined by the rider, and according to the position which the cage occupies during the performance. Said cage somewhat resembles a globe, the ends being cut off in parallel lines so that the ends are open; in horizontal cross section, the cage is circular. While various constructions of cages may be employed in carrying out the invention, it is preferred to employ a knockdown construction for convenience in storage and transportation, one practical form being shown in Figs. 1, 2, 3, 5, 7 and 9 of the drawings. The cage consists of a large number of slats $a$, a central external band or hoop $a'$ and other bands or hoops $a^2$, $a^3$. The slats $a$, composing the body of the cage, are each curved longitudinally, see Fig. 5, and the bands or hoops $a'$, $a^2$, $a^3$ are positioned externally on these slats, said slats being attached in any suitable way to the series of external bands, so as to produce a substantial and rigid construction which, however, is comparatively light in weight, for the reason that the cage and other parts of the apparatus must be transported from place to place in giving exhibitions, etc. The central band or hoop $a'$ is composed of a channel bar bent to the required circular form, said central band being divided transversely at suitable intervals so as to produce a number of sections. When the cage is set up for use, these sections are assembled in end to end order, and are rigidly fastened together, thereby resulting in a complete ring or hoop at the middle of the cage. The other external bands or hoops $a^2$, $a^3$ are positioned substantially at the open ends of the cage, each of said end bands or hoops being composed of sections, in order that said sections may be readily attached to, or detached from, each other, whereby the cage is rendered "knockdown" or portable in construction. As shown more particularly in Figs. 2, 3, 5, 9 and 11, each end band or hoop consists of a series of segmental sections, provided near their ends with plates $b$, having ears or lugs $b'$, through which ears or lugs are passed bolts $b^2$ provided with suitable nuts, whereby the sections may be connected in series, so as to produce a complete band.

It is to be observed that the middle hoop $a'$, and the end hoops $a^2$, $a^3$, each comprise a series of curved sections, the sections of the respective hoops corresponding in length. To these sections of hoops are attached the curved slats $a$, whereby the cage is composed of a number of parts, each part comprising a series of slats, a section of the middle hoop $a'$, and sections of end hoops $a^2$, $a^3$, so that the parts may be assembled and fastened together to produce a complete cage which is light, yet strong in construction. When the parts of the cage are thus assembled, certain binding blocks $c$ and cables or rods C are employed for the purpose of drawing and retaining the several parts into firm engagement. The blocks $c$ are positioned exteriorly to the slats $a$, and across the lines or joints where the parts of the sectional cage meet each other, see Fig. 9, said blocks being provided with grooves $c'$, see Fig. 11. Two series of blocks $c$ are employed, one at each end of the cage, and in the grooves $c'$ of said blocks are positioned the binding cables C, the respective ends of each cable (or rod) being threaded to receive a turn buckle $c^2$. It will be observed that each end hoop is adapted to be positioned upon the series of slats $a$ at one end of the cage, so that the sections when assembled will be united by the bolts $b^2$, and further, that each binding rod or cable C is adapted to be placed in the seats $c'$ of blocks $c$, and to be connected by the turn buckles $c^2$, whereby the operation of tightening the turn buckles will draw upon the binding rods or cables in a manner to tighten the hoop around the cage.

Figure 8:
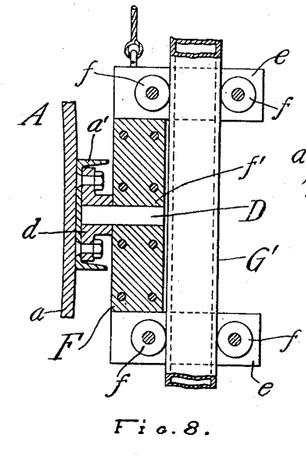
Fig. 8 is a vertical section, partly in elevation, and on an enlarged scale, illustrating one of the upright posts, a slidable carriage thereon, and means whereby the cage is adapted to be connected pivotally to said slidable carriage for movement on a horizontal axis.
Figure 9:
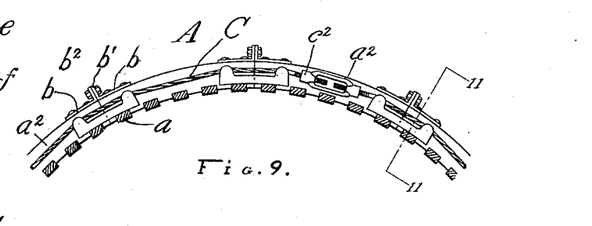
Fig. 9 is a detail sectional plan view of a part of the cage, illustrating the means for binding the slats thereof in firm relation to each other.
Figure 10:
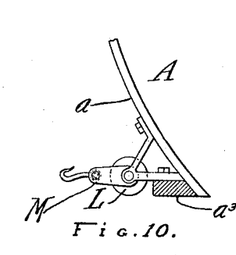
Figs. 10 and 11 are detail views of parts of the apparatus, said Fig. 11 being a cross section on the line 11—11 of Fig. 9.
Figure 11:
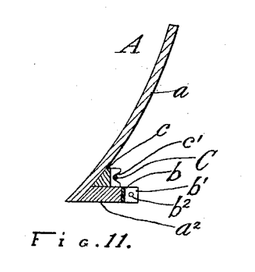

Cage A is provided at diametrically opposite points, with stub shafts or axles D, one of which is shown in Fig. 8. Each stub shaft or axle is attached to, or made integral with, a block $d$, the latter being positioned within or between the flanges of the central hoop or band $a'$, said block being fastened rigidly to the band by any suitable means. The stub shafts or axles D are supported in sliding carriages E, F, and these carriages are adapted to run upon posts or uprights G, G', respectively, the carriage E and the post G being positioned at one side of the cage, and the carriage F and post G' being disposed at the opposite side of the cage, as more clearly shown in Fig. 1. Each post G, G' is provided at its lower end with a base $g$, adapted to rest upon the floor or other surface, and each post is braced in position by suitable means, in order to preclude swaying or movement of the post when the cage is elevated or tilted. The brace rod $g'$ is fastened at its upper end to each post and at its lower end to the base plate $g$. Anchor cables $h$ are attached to the upper end of the posts, two of said cables extending from opposite sides of each post. Each cable $h$ is provided with a hook adapted for engagement with the floor anchor $h'$, said anchor cables operating to retain the post rigidly in position.

Each carriage E or F is constructed in any suitable way, so as to have movement upon one of the posts; as shown, each carriage is provided at its ends with offstanding members $e$ adapted to embrace the post, and with rollers or wheels $f$ journaled in the carriage, and positioned for engagement with the post, whereby the carriage is retained in operative relation to the post, and it is free to travel thereon. Intermediate their ends, the carriages are provided with openings $f'$ to receive the stub shafts or axles D of the cage, whereby said cage is pivotally supported upon, and between, the slidable carriages.

Coöperating with the sliding carriages are hoisting cables H, H', said cables being wound upon one of the two windlasses or drums employed in the apparatus, the windlass or drum for the hoisting cables H, H' being designated at I. This drum or windlass is operated by hand or otherwise so that the cables H, H' may be coiled thereon simultaneously, for the purpose of bodily lifting the cage in a vertical direction, and to a position a suitable distance above the floor of a stage, or other surface. One end of cable H is attached to a hook or eye $i$ fastened to the upper end of carriage E; from thence the cable extends upwardly over a pulley $i'$, journaled in the upper end of post G; from thence the cable extends in a downward direction to and beneath pulley $i^2$ attached to the base plate $g$ at a point adjacent the post G, and thence the cable is coiled in one direction upon windlass or drum I. The other cable H' is fastened at one end to a hook or eye $j$ provided on the upper part of carriage F; from thence the cable extends upwardly to and over a pulley $j'$ provided at the upper end of post G'; from thence the cable extends to and beneath a pulley $j^2$ provided on the base plate $g$ of post G'; from thence the cable extends along the floor and below the cage A so that the cage rests on the cable, said cable thence extending beneath a companion pulley to the pulley $i^2$, and finally cable H' is coiled upon windlass or drum I in the same direction as cable H. The windlass or drum is mounted on a shaft I', which shaft is journaled in a suitable framework which includes supporting plates or posts $k$, attached rigidly to base plate $g$ of post G. Said drum is provided with a gear $k'$, with which meshes a gear $k^2$ on a shaft K, said shaft being provided with a hand crank $k^3$, see Figs. 1 and 2. The hand crank affords a convenient means for operating the drive shaft K to impart rotary motion to drum I, for the purpose of exerting tension upon hoisting cables H, H' in a manner to coil said cables upon said drum, and thus elevate cage A to a desired position above the floor of a stage or other surface. Any suitable means (not shown) may be used for locking drum I against rotation.

It is evident that the rotation of drum I in one direction will simultaneously coil cables H, H', for the purpose of elevating carriage E, F, and cage A; and, further, that drum I may be so manipulated as to slowly rotate in a reverse direction, for the purpose of uncoiling the cables from the drum, thus allowing said cables to lower the slidable carriages and the cage, whereupon the cage will be so positioned that one of its open ends will rest upon the floor or other surface. Manifestly, a motor may be employed in lieu of the hand crank $k^3$, for the purpose of operating drum I by power instead of by hand.

In addition to the cables for hoisting the cage as heretofore described, my apparatus is provided with another set of cables O, P, the latter operating to perform two functions, mainly, first, to steady the cage or preclude turning thereof on a horizontal axis when said cage is hoisted by cables H, H' and the rider or riders are performing within the cage, and, second, to impart a rotative or turning movement on a horizontal axis to said cage.

During the operation of hoisting the cage by cables H, H' and drum I, cables O, P are held taut and paid out slowly and uniformly from a windlass or drum, Q, whereby cables O, P operate to preclude cage A from turning when said cage is hoisted to a suitable elevation above the floor, thus retaining the cage steadily in position when it is hoisted or lowered so that the rider or riders may perform within the cage. The cables O, P are especially useful in imparting a rotative movement to the cage when a rider is performing therein.

Figure 1:
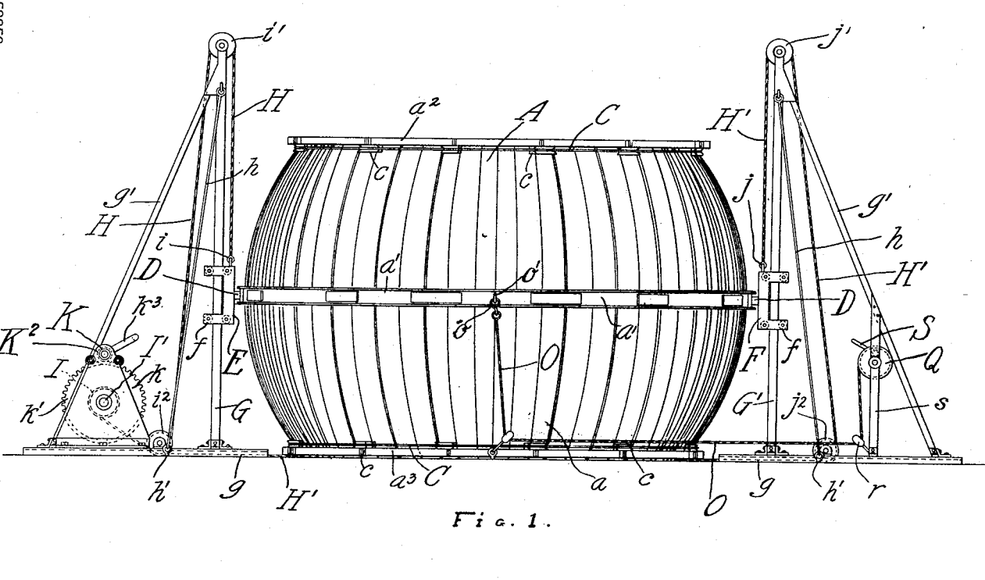
Figure 1 is a side elevation of an apparatus embodying this invention, and illustrating the cage in a lowered position, the axis of the cage being vertical.
Figure 2:
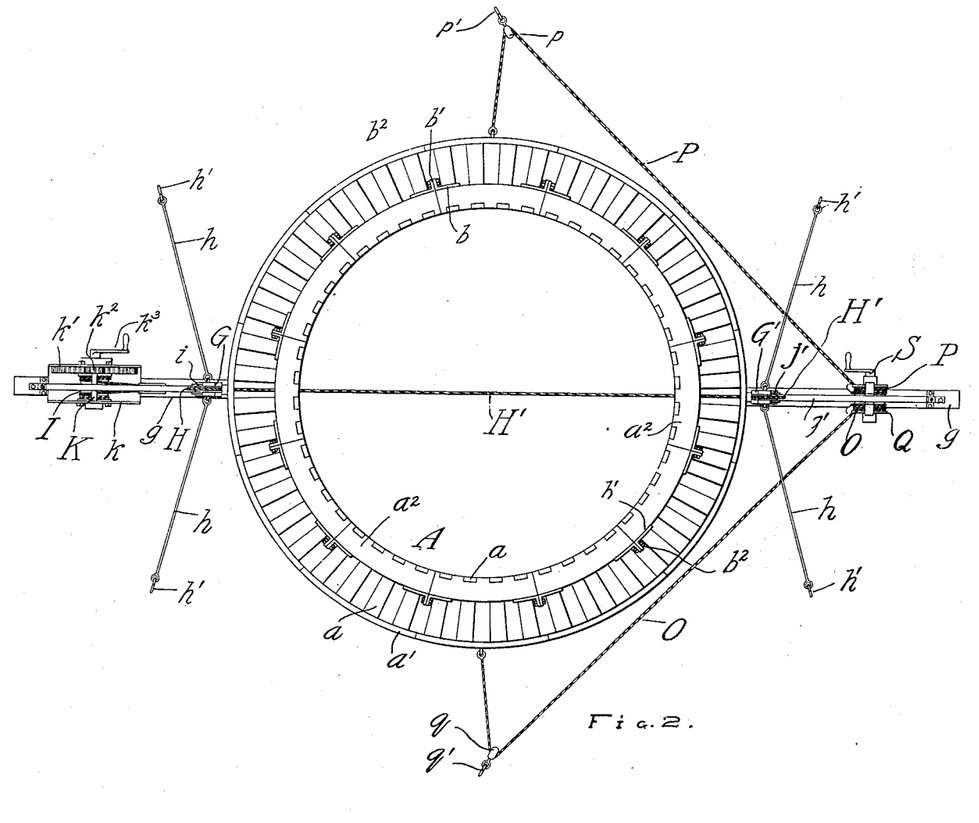
Fig. 2 is a plan view of the apparatus shown in Fig. 1, one set of the cables being adjusted for hoisting the cage and the other set of cables being adjusted for steadying the cage during the hoisting operation.
Figures 5, 6, 7:
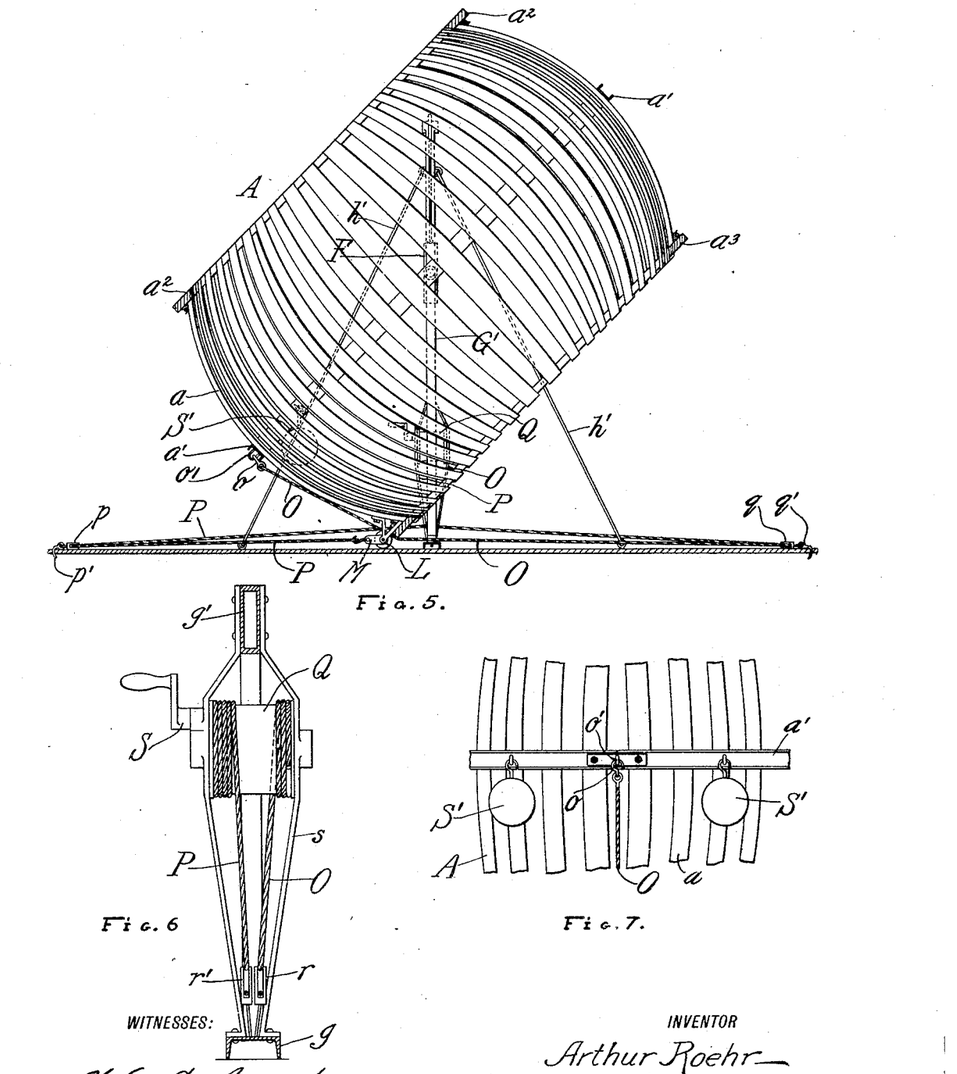
Fig. 5 is a view partly in vertical section through the cage and partly in elevation, the cage being shown in a tilted or turned position and one set of cables operating to turn the cage on a horizontal axis.
Fig. 6 is an elevation of one of the windlasses and one set of ropes, the latter being adjusted for turning the cage on a horizontal axis.
Fig. 7 is an elevation, on a reduced scale, of a part of the cage showing certain weights suspended thereon for the purpose of balancing the cage when it is rotated and the performer is riding therein.

As will hereinafter appear, when the cage is turned on a horizontal axis, cables O, P are attached to said cage in a different manner than the attachment of the cables to the cage for steadying it during the operation of hoisting the cage by cables H, H'. For steadying the cage during the hoisting operation, the cables O, P are attached to the respective sides of the cage, as shown in Fig. 2 and indicated also in Fig. 1, so that said cables will pull uniformly on the sides of the cage to preclude turning thereof, the cables being paid out uniformly or evenly from windlass Q; but when the cage is at rest upon the floor, as in Fig. 1, cables O, P may be disconnected from the cage, shown in Fig. 2, and thereafter said cables O, P may be arranged and attached to the cage as in Figs. 3 and 5, so that the cables are effective in turning the cage on a horizontal axis and in one direction, as shown in Fig. 5. In all positions of cables H, H', O, P, they are exterior to the cage, that is, they do not pass into or through the chamber of the cage, although one or more of said cables may pass across an open end of the cage, but exteriorly thereto, as shown in Figs. 2, 3, 5, whereby the cables do not interfere in any manner whatever with the performance conducted within the cage.

The cage A is provided on the hoop or band $a^3$ with a roller L, said roller being positioned for contact with the floor (see Fig. 5) during the operation of turning the cage on a horizontal axis, provided said cage is not raised to a position sufficiently high above the floor for the lower edge of the cage to clear said floor when it is turned. From the axle or roller L extends a shackle M, and to this shackle is connected cable P of the two cables O, P. When cables O, P are to be operated for turning the cage, said cables are arranged as follows: Cable O is provided at one end with a hook $o$, which engages with a ring or eye $o'$, the latter being attached in a suitable way to hoop or band $a'$ at a point equi-distant from stub axles D, D, see Fig. 5. From the ring or eye, cable O extends to the floor and beneath the cage, said cable running from the cage to and around sheave $q$ which is attached in a suitable way to a floor anchor $q'$, the latter being positioned upon the floor, and at a suitable distance from the position assumed by the cage when it rests upon the floor. From sheave $q$, cable O extends to and beneath one sheave $r$ of a pair of direction sheaves $r$, $r'$, (see Fig. 4) and from sheave $r$, the cable O extends upwardly to a winding drum Q. The other cable P is attached at one end to shackle M; from thence cable P extends to and around a direction sheave $p$ which is connected in a suitable way to a floor anchor $p'$, the latter being attached to the floor and at the opposite side of the cage from anchor $q'$. From sheave $p$, cable P extends to and beneath the other direction pulley $r'$ of the pair of direction pulleys $r$, $r'$ supported on the plate $g$ of the post G', and finally said cable P is wound or coiled on the winding drum Q, (see Fig. 6).

Figure 4:
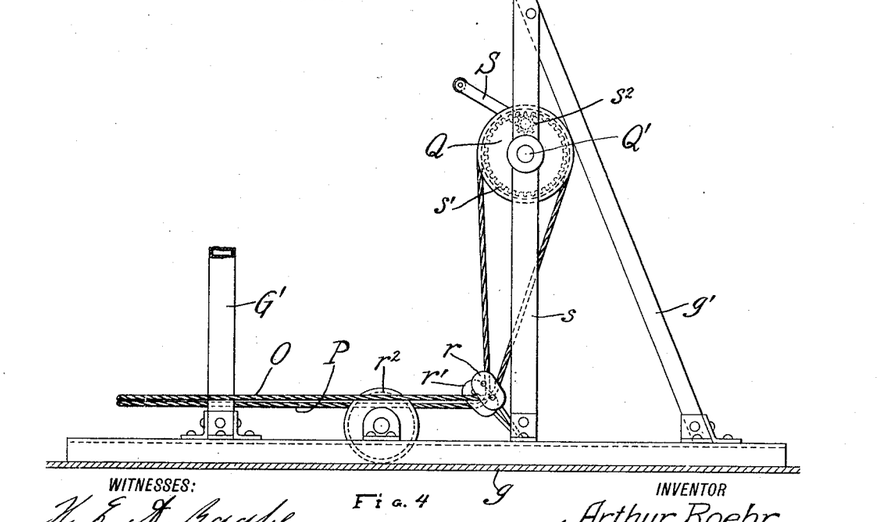
Fig. 4 is a side elevation of one of the windlasses employed in connection with one set of ropes and the cage, the particular windlass and set of ropes shown in this figure being operable for turning the cage.

In the construction shown in Figs. 4 and 6, winding drum Q is carried by a suitable shaft Q' supported in bearings of an upright frame $s$, the latter being fastened rigidly to the base plate $g$ of post G'. Said winding drum Q is provided with a gear $s'$ which meshes with a pinion $s^2$ upon a crank shaft S, whereby the crank shaft is adapted to be rotated by hand for the purpose of turning drum Q so as to wind cables O, P on said drum or to unwind the cables therefrom in a manner presently to be described.

Figure 3:
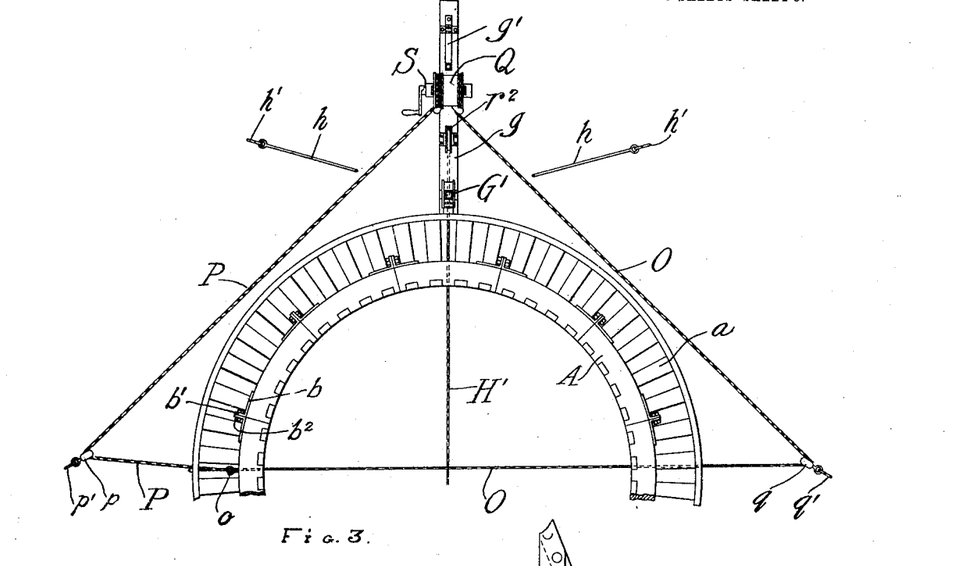
Fig. 3 is a plan view of a part of the cage, certain of the ropes being adjusted for turning the cage on a horizontal axis afforded by certain trunnions to be hereinafter described.

As shown in Fig. 3, cables O, P run from sheaves $r$, $r'$ in inclined directions to floor pulleys $p$, $q$, but under some circumstances these cables O, P may be guided to sheaves $r$, $r'$ by direction pulleys $r^2$, see Fig. 4, said pulleys being suitably supported on base plate $g$ between frame $s$ and post G'. When the cage is to be hoisted in a vertical direction, the cage being in the position of Fig. 1, wherein the axis of the cage is vertical, drum I is operated by crank shaft K for the purpose of drawing upon cables H, H', whereby the carriages E, F and cage A are raised in a vertical direction. Previous to this, however, cables O, P are adjusted or arranged for the purpose of steadying the cage during the hoisting operation, that is to say, cable O is connected to the cage at one side thereof, thence extends beneath pulleys $q$, $r$ and is wound in one direction around the drum Q, whereas cable P is connected to the opposite side of cage A, thence extends around pulleys $p$, $r'$ and is wound in the same direction around drum Q, whereby the two cables O, P are wound in corresponding directions around windlass Q so as to be simultaneously coiled on said windlass or to be uncoiled therefrom according to the direction in which the windlass is rotated. The arrangement of cables O, P and the coiling of said cables in one direction on windlass Q is illustrated in Fig. 2 of the drawings. During the hoisting operation, windlass Q is rotated slowly for the purpose of uncoiling cables O, P simultaneously while maintaining tension on said cables in a manner to keep the cables taut and thereby hold the suspended cage in a steady position during the operation of hoisting said cage, whereby one or more riders are enabled to perform the act within the cage during the operation of hoisting said cage. When it is desired to lower the cage, drum I is rotated in a direction to uncoil cables H, H', whereas drum Q is rotated to take up cables O, P, the cage lowering itself by gravity and the weight of the performers therein and cables O, P serving the important purpose of precluding the cage from tilting on trunnions D by which the cage is suspended from the sliding carriages.

In addition to performing the function of steadying the cage during the hoisting and lowering operation cables O, P are adapted for adjustment or arrangement in such a manner that they will operate to turn or rotate the cage on a horizontal axis afforded by trunnions D. For this purpose one of the cables, cable O, is connected detachably to windlass Q in order that said cable O may be unwrapped from said windlass Q and wrapped by hand around said windlass in an opposite direction to that in which cable P is coiled on the windlass, it being understood that the operation of removing and recoiling cable O is performed by hand and when the cage A is in the position of Fig. 1, which shows said cage resting upon the floor. After the operator has unwrapped cable O and partially wrapped it around drum Q in an opposite direction to cable P, all as shown in Fig. 6, the act or performance may be proceeded with by one bicycle rider performing within cage A. During such performance the cage may be slightly raised by placing tension upon cables H, H' through the operation of drum I, but it is important at this time to note that windlass Q is operated for the purpose of placing tension on one cable and slackening upon the other cable in a manner to turn cage A on the horizontal axis afforded by trunnions D. When tension is placed upon cable O, and cable P is slackened, by rotating windlass Q in one direction, it is evident that the cage A will be turned on trunnions D, care being taken to turn the cage slowly on the horizontal axis in order that the rider may be given an opportunity to so conduct the performance within the cage as to maintain his equilibrium on the bicycle within said cage. When the cage begins to turn to the position of Fig. 5, roller L rides upon the floor of the stage so as to assist in keeping the cage in a steady position while the rider is performing therein, but it is manifest that by a continued slow turning movement of windlass Q the cables O, P are so manipulated and controlled as to gradually turn the cage to a position wherein the axis of said cage is horizontal, at which time the rider performs the unusual feat of moving in a vertical circular path within the cage. This is due to the high speed of the bicycle within the cage, by the efforts of the rider, and to the momentum acquired by the rider and the bicycle while performing within the cage, whereby the rider and the bicycle are capable of making a number of complete turns within the cage when it is in a vertical position, the axis being horizontal or substantially so. Manifestly, the cage may be hoisted vertically a suitable distance above the floor by the operation of cables H, H' and drum I, or the cage may be lowered, and thereafter the cage may be returned back to its normal position by the operation of windlass Q and cables O, P.

Prior to turning the cage as last described, and as partly illustrated in Fig. 5, certain balance weights S' are connected to, or suspended from, one side of the cage substantially as shown in Fig. 7, and indicated in dotted lines in Fig. 5. These balance weights are connected detachably to the cage by suitable hooks engaging with eyes, the latter being secured rigidly to channeled band $a'$ as shown in Fig. 7. The balance weights are positioned at the respective sides of cable O, and they are suspended from that side of cage A which is to be lowered toward the floor, as will be evident from an inspection of Fig. 5. The weights balance and steady the cage during the operation of turning it, but the main purpose of using the weights is to counteract the action upon the cage of the rider and the bicycle due to the centrifugal force of the bicycle and the rider against the upper side of the cage. Assuming that the rider weighs about 170 pounds and the bicycle from 10 to 20 pounds, it is preferred to employ weights of about 450 pounds, and to suspend said weights from the under side of the cage. Of course, the weights are not used when the cage is to be hoisted in the position of Fig. 1, and for this reason the weights are connected detachably to the cage.

Figure 12:
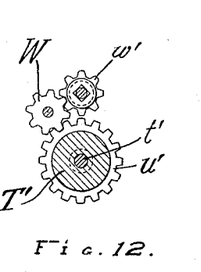
Fig. 12 is a detail sectional view on the line 12—12 of Fig. 13.
Figure 13:
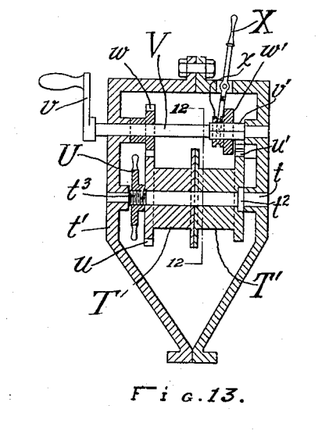
Fig. 13 is a vertical section through a preferred form of windlass whereby one set of ropes may be used to steady the cage when hoisting the latter and the same set of ropes may be manipulated to turn or partially rotate the cage on a horizontal axis.

In Figs. 12 and 13 of the drawings there is shown mechanism for operating cables O, P without the necessity of the attendant to change one of the cables on windlass Q. Said operating mechanism embodies two drums T, T' which are loosely and independently mounted on an arbor or spindle $t$, the latter being journaled in suitable bearings of a frame $t'$. Said arbor or spindle is provided with a collar $t^2$, and near one end the spindle is externally threaded as at $t^3$. Drum T is provided at one end with a gear $u$, whereas drum T' is provided at one end with a gear $u'$, but at their adjacent ends drums T, T' are provided with flanges and friction faces, whereby the two drums are adapted to be frictionally connected for simultaneous rotation on spindle or arbor $t$. This frictional contact between the two drums is secured by the employing of any suitable clutch device, and in Fig. 13 said clutch device is represented as a hand wheel U, the hub of which is provided with a threaded bore, whereby the hand wheel is adapted to be screwed upon the thread $t^3$ of the spindle or arbor so that said hand wheel will engage with drum T, for the purpose of moving said drum T lengthwise of the arbor or spindle. By this construction drum T is adapted to be forced in one direction by the hand wheel, for the purpose of bringing the two drums into frictional engagement, thus causing the two drums to rotate as a unit, but when the hand wheel is adjusted in an opposite direction, the frictional engagement of drums T, T' is slackened, and thus the drums are permitted to rotate on the arbor or spindle independently of each other for a purpose which will presently appear. V designates a shaft adapted to be operated by a hand crank $v$, said shaft being journaled in suitable bearings of frame $t'$ above and parallel to arbor $t$. Secured rigidly to the shaft is a gear $w$ which meshes directly with gear $u$ of drum T. Shaft V is provided with a square or polygonal part $v'$, and on this part of the shaft is fitted a slidable gear $w'$, said gear being adapted at all times to rotate with shaft V. The gear is provided with a grooved hub $x$ with which engages a hand lever X, the latter being fulcrumed in frame $t'$ so that it may be operated by the attendant in a manner to move gear $w'$ into and out of mesh with an idler gear W, see Fig. 12. This idler gear meshes with the gear $u'$ of drum T', and when gear $w'$ is moved to an operative position, said idler gear W meshes with both the gear $w'$ and the gear $u'$, whereby the shaft V is adapted through gears $w'$, W, and $u'$ to rotate drum T' in one direction, and said shaft is adapted, also, to operate gears $w$, $u$ for the purpose of rotating drum T in an opposite direction to drum T'.

The mechanism just described is employed for rotating drums T, T' simultaneously in one direction in order to coil cables O, P simultaneously upon drums T, T' or to uncoil said cables simultaneously from said drums, as is required in the operation of steadying cage A during the hoisting thereof, but the described mechanism may be employed, also, for the purpose of rotating drums T, T' in opposite directions to each other, in order to pay out cable O while drawing in on cable P, or vice versa, said operations of paying out one cable and taking in the other cable being performed simultaneously.

When hoisting the cage, drums T, T' are clutched together for simultaneous rotation by the adjustment of hand wheel U, gear $w'$ being shifted out of mesh with idler gear W and shaft V being rotated to impart simultaneous movement to drums T, T' in one direction or the other, so as to keep the required tension upon cables O, P when they are adjusted as shown in Fig. 2, for the purpose of steadying the cage during the hoisting operation. Prior to turning the cage, cables O, P are connected therewith in the manner shown in Figs. 3 and 5, and the power mechanism is adjusted as follows: Hand wheel U is turned to the left so as to release drums T, T' from frictional engagement and thus place them in a condition to rotate independently of arbor $t$. Lever X is operated by hand to shift gear $w'$ into mesh with idler gear W. When shaft V is turned it operates gears $w$, $w'$, said gear $w$ imparting rotary motion to gear $u$ and drum T, whereas the gear $w'$ rotates idler W and gear $u'$ for the purpose of rotating drum T', in an opposite direction to drum T. By this arrangement cable O is adapted to be coiled upon drum T' when cable P is uncoiled from drum T by turning shaft V in one direction, but when said shaft is turned in an opposite direction then cable P is coiled upon drum T and cable O is uncoiled from drum T', whereby cables O, P may be operated to impart the turning movement to cage A. By employing the power mechanism of Figs. 12 and 13 it is not necessary for the operator to change the direction in which one cable is coiled oppositely to the other cable upon the windlass, for the reason that the operator by manipulating the hand wheel clutch U and lever X may place the power mechanism in a position to rotate drums T, T' simultaneously in one direction, or said drums may be rotated simultaneously in opposite directions.

Having thus fully described the invention, what I claim as new, and desire to secure by Letters Patent is:—

1. In an apparatus of the class described, the combination of a plurality of fixed posts, carriages slidably fitted on said posts, a cage pivoted to said carriages and adapted to be supported in a raised position thereby, said cage being free to turn on a horizontal axis afforded by said pivotal connections, hoisting cables connected to said carriages, and cage turning mechanism separate from the hoisting cables.

2. In an apparatus of the class described, the combination of a plurality of fixed posts, carriages slidably fitted on said posts, a cage pivoted to said carriages, separate hoisting cables connected to said carriages, a winding drum for said hoisting cables, and turning cables connected to the pivoted cage, said turning cables being separate from the hoisting cables.

3. In an apparatus of the class described, the combination of a plurality of fixed posts, carriages slidably fitted on said posts, a cage pivoted to said carriages, hoisting cables connected to the carriages for raising and lowering the carriages and the cage, a winding drum whereon the cables are wound, and other cables connected to said cage intermediate the pivotal connections between the hoisting cables and the carriages, said cables being separate from the hoisting cables and operating to steady the cage during the hoisting thereof.

4. In an apparatus of the class described, the combination of a pivoted cage, hoisting mechanism therefor, a windlass separate from the hoisting mechanism, and cables connected with the cage and operated by the windlass for steadying the cage during the hoisting operation, said cables and windlass being adapted to impart rotary movement to said cage.

5. In an apparatus of the class described, the combination of a pivoted cage, the inner surface of which constitutes a track for a bicycle, means for imparting rotary movement to the cage, and means for balancing said cage in opposition to the centrifugal force of a bicycle rider performing within the cage, said balancing means being independent of the bicycle adapted to traverse the cage.

6. In an apparatus of the class described, the combination of a pivoted cage, the inner surface of which constitutes a track for a bicycle, means for imparting rotary movement to said cage, and balancing weights suspended from the cage adjacent to an edge thereof to counteract the centrifugal force of a bicycle and the rider thereof during a performance within the cage, said balancing weights being independent of the bicycle adapted to traverse the cage.

7. In an apparatus of the class described, the combination of a pivoted cage, the inner surface of which constitutes a track for a bicycle, means for imparting rotary movement to said cage, and balancing weights detachably connected to the cage adjacent to an edge thereof, to counteract the centrifugal force of a bicycle and the rider thereof during a performance within the cage, said balancing weights being independent of the bicycle adapted to traverse the cage.

8. In an apparatus of the class described, the combination of a cage, a windlass and cables for hoisting the cage, a separate windlass, and separate cables connected to the separate windlass and to the cage near the opposite edges thereof for steadying the cage during the hoisting operation.

9. In an apparatus of the class described, the combination of a pivoted cage, means for hoisting the same, a plurality of windlasses rotatable on a common axis, cables connected to the cage and wound on the respective windlasses, and mechanism whereby the windlasses may be rotated simultaneously in one direction or said windlass may be rotated simultaneously in opposite directions to each other.

10. In an apparatus of the class described, the combination of a pivoted cage, hoisting mechanism therefor, a plurality of windlasses rotatable on a common axis, cables connected to the cage and wound on the respective windlasses, clutching means whereby the windlasses may be rotated simultaneously in one direction, and means for imparting rotary motion simultaneously to said windlasses in opposite directions to each other.

11. In an apparatus of the class described, the combination of fixed upright guides, carriages slidable on said guides, a cage pivoted to said carriages, a windlass and cables for hoisting the carriages and the cage, a separate windlass, and cables connected to the cage and wound on said separate windlass for steadying the cage during the operation of hoisting it and for imparting rotary motion to said cage on a horizontal axis.

In testimony whereof I have signed my name to this specification in the presence of two subscribing witnesses.

ARTHUR ROEHR.

Witnesses:
M. C. RODRIGUEZ.
J. F. MOTHERSHEAD.

Copies of this patent may be obtained for five cents each, by addressing the "Commissioner of Patents, Washington, D. C."